H. M. SHEDD.
ELECTRIC POWER SYSTEM.
APPLICATION FILED MAR. 11, 1916.
1,231,953.
Patented July 3, 1917.
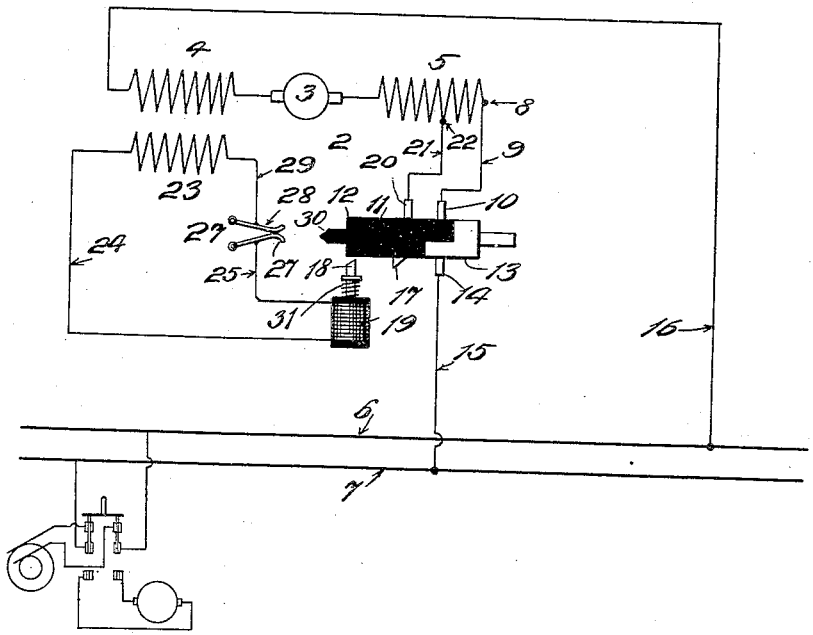
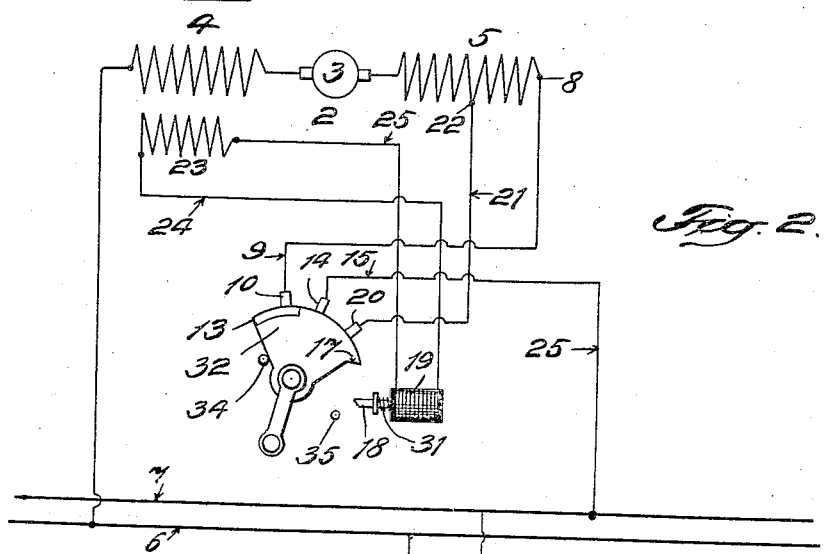
WITNESSES:
INVENTOR
HARRY M. SHEDD
BY
HIS ATTORNEY

UNITED STATES PATENT OFFICE.

HARRY M. SHEDD, OF ELIZABETH, NEW JERSEY.

ELECTRIC POWER SYSTEM.

1,231,953.

Specification of Letters Patent.   Patented July 3, 1917.

Application filed March 11, 1916.   Serial No. 83,454.

*To all whom it may concern:*

Be it known that I, HARRY M. SHEDD, a citizen of the United States, and a resident of Elizabeth, county of Union, and State of New Jersey, have invented a new and useful Improvement in Electric Power Systems, of which the following is a specification.

The object of my invention is to place in circuit, a power consuming device such as a motor, which may be supplied with either a direct or an alternating electric current, and to have in connection therewith a manually shifted switch with an automatic control which will prevent placing the switch for one kind of current when another kind is supplied to the apparatus. This and other objects are accomplished by my invention, some embodiments of which are hereinafter more particularly set forth in the accompanying drawings forming a part hereof, in which Figure 1 is a diagram of a system embodying my invention.

Fig. 2 is a modification of the same.

Throughout the various views of the drawings, similar reference characters designate similar parts.

My improved system 1 has a power consuming device 2, such as a series motor with an armature 3 and magnet windings 4 and 5, which may be connected to conductors 6 and 7 respectively, which may be supplied with either a direct or alternating current, but not both at once. The winding 5 has an outlet 8 which runs to a conductor 9, and this conductor 9 is connected to a contact 10 which may rest either on the insulated portion 11 of a slide 12 or upon a metal surface 13 secured to the insulating portion, according to the location of the slide 12. A second brush 14 always rests on the metal 13 and is connected by a conductor 15 to the wire 7. A wire 16 runs from the conductor 6 to the magnet 4 so that when the apparatus is used for a direct current the circuit is complete through the wire 16, magnet 4, armature 3, field magnet 5, outlet 8, wire 9, brush 10, metal contact 13, the switch 12 being shoved over for the purpose, and thence to the brush 14, wire 15 to the conductor 7. A projection 17 engages the core 18 of a magnet 19, and this core is so situated that the projection 17 cannot get by the core 18 so that in this event it is impossible to shift the contact far enough to put the plate 13 under a brush 20, which is connected to a wire 21 which runs to an outlet 22 in the magnet 5. If it were possible to shove the contact 13 far enough over so as to engage the brush 20 some of the coils of the magnet 5 would be shortcircuited and then there would not be sufficient resistance to prevent the direct current from burning out the motor or other power consuming device. However, the motor cannot be operated effectively with an alternating current with so many coils in the winding 5 as are required for a direct current, so that it is necessary to get some of these coils out. This is done in the following way: A secondary coil 23 is placed in inductive relation to the field magnet 4 of the motor 2, and then this motor, when energized by an alternating current, has an induced current in the winding 23 which is connected to a conductor 24, which runs to the magnet 19, and thence through a conductor 25 to a spring jaw 26 of a switch 27. The other spring jaw 28 of this switch 27 is connected to a conductor 29 which runs to the other end of the winding 23. The insulated block 11 of the switch 12 has a point 30 which is adapted to engage the spring jaws 27 and 28 and separate the same so that there is no contact between them when the switch 11 is thrown far enough for this purpose. From what has been described above it is clear that as long as the projection 17 engages the core 18 it is impossible to shove the switch bar 11 far enough to separate the jaws 26 and 28 of the switch 27. However, as this core 18 is withdrawn against the tension of the spring 31 by the magnetism in the magnet 19 whenever an induced current is had in the winding 23, at such a time it is possible to shift the switch block 11 without any interference from this core 18, and then the circuit in the winding 23 is open and no waste current passes through it and the contact 13 is shoved far enough over to be in contact with the brush 20 so that the apparatus is then in a suitable condition for an alternating current.

In the structure shown in Fig. 2 there is a slight modification in that the switch 27 and parts connected therewith are omitted, and instead of having a sliding switch 12 an oscillating switch 32 is employed which turns on a shaft 33 with a stop-pin 34 mounted in any suitable support to prevent the sector 32 from being thrown too far over in one direction, say to the left, and to the right the throw is limited when a direct current is passing through the apparatus by the core 18 of the magnet 19, and when an alternating current goes through the apparatus this core is withdrawn into the magnet against the tension of the spring 31, and then the sector 32 may be thrown to a second limit pin 35. In this case, as in the former, the magnet 19 and its connected parts act as a magnetic limiting device connected to the secondary winding for determining the limit to which the switch can be thrown in one direction. If desired, it would be easy to reverse the action of this magnet 19 and its core 18 so as to make this core be projected when an alternating current is employed and withdrawn when a direct current is employed, and then the corresponding changes would have to be made in the system, as is obvious.

While I have shown and described two embodiments of my invention, it is obvious that it is not restricted thereto but is broad enough to cover all structures that come within the scope of the annexed claims.

Having thus described my invention, what I claim is:

1. In a system of the class described, an electric power consuming device having an electromagnet, suitable for either alternating or direct currents, a pair of conductors which may supply either a direct or an alternating current to said device, but not both simultaneously, a secondary winding in inductive relation to the winding of said magnet, a switch for changing the connections of said magnet for either a direct or an alternating current and a magnetic limiting device connected to said secondary winding whereby the said switch may not be thrown beyond predetermined limits when one kind of current is employed and may be thrown beyond these limits then another kind of current is employed.

2. In a system of the class described, an electric motor having an electromagnet suitable for either alternating or direct currents, a pair of conductors which may supply either a direct or alternating current to the said motor, but not both simultaneously, a secondary winding in inductive relation to the winding of said magnet, a switch for changing the connections of said magnet for either a direct or alternating current and a magnetic limiting device connected to said secondary winding whereby the said switch may not be thrown beyond predetermined limits when one kind of current is employed, and may be thrown beyond these limits when another kind of current is employed.

3. In a system of the class described, an electric motor having an electromagnet suitable for either alternating or direct currents, and means for changing the electrical resistance of the field circuit of said motor, a pair of conductors which may supply either a direct or alternating current to said motor, but not both simultaneously, a secondary winding in inductive relation to the winding of said magnet, a switch for changing the connections of the field magnets of said motor for either a direct or alternating current and a magnetic limiting device connected to said secondary winding whereby the said switch may not be thrown beyond predetermined limits when one kind of current is employed and may be thrown beyond these limits when another kind of current is employed.

HARRY M. SHEDD.